United States Patent [19]

Becker

[11] Patent Number: 4,746,349

[45] Date of Patent: May 24, 1988

[54] METHOD AND COMPOSITIONS FOR SUPPRESSING THE NITRIFICATION OF AMMONIUM IN PLANT GROWTH MEDIUM

[75] Inventor: Robert H. Becker, Pennington, N.J.

[73] Assignee: American Cyanamid Company, Stamford, Conn.

[21] Appl. No.: 893,838

[22] Filed: Aug. 6, 1986

[51] Int. Cl.$^4$ .................. C05F 11/08; A61K 35/66
[52] U.S. Cl. .................................... 71/6; 71/27; 71/902; 424/115; 424/120; 424/122
[58] Field of Search .................. 424/125, 120, 122; 71/6, 7, 902, 27

[56] References Cited

U.S. PATENT DOCUMENTS 3,995,027 11/1976 Gale et al. .................. 424/115

Primary Examiner—Ferris H. Lander
Attorney, Agent, or Firm—Estelle J. Tsevdos

[57] ABSTRACT

The present invention relates to methods for suppressing the nitrification of ammonium nitrogen in plant growth medium or soil and compositions which conserve soil nitrogen and supply soil nitrogen requirements necessary for plant nutrition.

24 Claims, No Drawings

METHOD AND COMPOSITIONS FOR SUPPRESSING THE NITRIFICATION OF AMMONIUM IN PLANT GROWTH MEDIUM

BACKGROUND OF THE INVENTION

The present invention relates to methods to suppress the nitrification of ammonium nitrogen in plant growth media and compositions which conserve soil nitrogen.

Nitrogen is essential in the growth and development of plants. A major portion of the nitrogen requirements of plants is obtained from the soil, generally in the form of ammonium ions and nitrate ions. Therefore, in order to ensure proper growth of plants by providing essential nitrogen to said plants, it is essential in crop cultivation to provide the nitrogen requirements in either the ammonium ion or nitrate ion form. Generally, bacterial conversion of organic nitrogen originating from animal manure, crop residues, fish products or the like, or provided by the distribution throughout the soil or plant growth media of an inorganic nitrogen fertilizer such as anhydrous ammonia, aqueous ammonia, urea, ammonium chloride, biuret, ammonium phosphate, cyanamide, dicyandiamide, ammonium nitrate, ammonium salts of organic and inorganic acids and nitrogen phosphorous inorganic complexes fulfills this need.

However, ammonium ions are cationic and tend to bind to the soil colloidally, thereby allowing ready leaching from said soil. Even by oxidizing or nitrificating the ammonium nitrogen in soil, this ammonium nitrogen is converted from the ammonium to nitrate form, which is very water soluble and again easily leached from the soil. It is, therefore, important for proper soil management by the farmer to control the rate of conversion of ammonium nitrogen to nitrate nitrogen in the soil.

While it is recognized that soil type, moisture content, aeration, temperature and pH all contribute to the rate of nitrification of ammonium nitrogen, temperature and pH are the primary factors governing nitrification of ammonium nitrogen in soil as evidenced by the fact that at temperatures above about 10° C. and pH5, nitrification of ammonium nitrogen is very rapid and can account for production of more than 22 kg/hectare/week of nitrate nitrogen. Moreover, as the temperature rises, the rate of conversion of ammonium nitrogen to nitrate nitrogen also rises, as evidenced by the fact that at soil temperatures in the vicinity of 30° C., ammonium nitrogen can be converted to nitrate nitrogen at the rate of 450 kg/hectare/week. Thus, increasing temperature may cause subsequent leaching of the soil in which substantial nitrification has occured, thereby leaving the soil essentially depleated of the nitrogen required for proper plant nutrition.

Methods to inhibit such soil nitrification relate to controlling these parameters and most often, utilizing an effective nitrification inhibitor. One such inhibitor is nitropyrin. The present invention provides other means for inhibiting this unwanted nitrification, as effective and often superior to the preferred method of using nitropyrin.

It is an object of the present invention, therefore, to provide a method for inhibiting or suppressing nitrification of ammonium nitrogen in plant growth media and soil.

It also is an object of the present invention to provide a reduced nitrogen fertilizer composition, either in liquid or solid form, containing an effective amount of a nitrification inhibitor.

It is a further object of this invention to provide a method for inhibiting the bacterial action of organisms responsible for nitrification of ammonium nitrogen in the soil such as the bacteria Nitrosomonas spp. found in the soil.

To these ends, the present invention provides both method and compositions which fulfill the objectives mentioned above.

SUMMARY OF THE INVENTION

The present invention relates to methods for suppressing or inhibiting the nitrification of ammonium nitrogen in plant growth medium or soil by treating said plant growth medium with a nitrification-inhibiting amount of an ionophore antimicrobial or salt thereof. Novel compositions for supplying soil nitrogen requirements for plant nutrition and for inhibiting the conversion of ammonium nitrogen to nitrate nitrogen by bacterial action in the soil or plant growth medium are provided herein.

The method of the invention involves treating soil or plant growth medium with a nitrification-inhibiting amount of an ionophore or salt thereof, preferably a polyether antibiotic. The ionophore or ionophore salt may be applied to soil or plant growth medium neat, but is preferably applied in admixture with a liquid or solid diluent.

Previous to the present invention, those skilled in the art failed to recognize this soil nitrification inhibition activity by ionophores, as evidenced by the Commission of the European Communities' 1984 Reports of the Scientific Committee for Animal Nutrition. Thus, the use of ionophores, preferably polyether antibiotics, as soil nitrification inhibitors is novel and unexpected.

DETAILED DESCRIPTION OF THE INVENTION

Ionophores especially useful in the method and compositions of the present invention for suppressing or inhibiting the nitrification of ammonium nitrogen in the soil or other plant growth medium include but are not limited to the following: Monensin, Salinomycin, Lasalocid, Maduramicin, antibiotic CP 38295, antibiotic D42067α, Nigericin, Narasin, Epi-17-deoxy-(0–8)-salinomycin, iso-Lasalocid A, Noboritomycin A, Noboritomycin B, antibiotic CP 44.161, Lasalocid A, B, C, D and E, Etheromycin, Lenoremycin, Septamycin, Dinoemycin, Ionomycin, Lysocellin, antibiotic 6016, Grisorixin, Laidlomycin, Lonomycin A, B and C, Mutalomycin and antibiotic X-206, and salts thereof. Alkali metal or ammonium or organic ammonium salts are useful as salts of the invention.

As previously indicated, both liquid and solid diluents are useful in the compositions of the invention.

Solids useful as diluents for the active ingredients include, clays, such as montmorillonite, attapulgite, bentonite, kaolin; reduced nitrogen solid fertilizer compositions; talc; pumice; diatomaceous earth; ground corn cobs; corn cob grits; sand and the like. Other adjuvants such as emulsifiers and dispersing agents may also be admixed with the solid compositions of the present invention. Use of such diluents permit relatively uniform distribution of the nitrification-inhibiting ionophore on or in the soil or plant growth media.

These solid compositions are applied to the surface of the plant growth media as a broadcast application or a band between plant rows. They also may be preplant incorporated into soil using conventional techniques.

The nitrification inhibiting ionophores or ionophore salts of the present invention are dissolved or dispersed in liquid diluents, such as water; reduced nitrogen liquid fertilizers; petroleum distillates; or organic solvents such as dimethylsulfoxide, lower alkyl alcohols, lower alkyl ketones, benzyl alcohol, cyclohexanone, or the like and applied to soil or plant growth media as a liquid spray or drench. They also are admixed with irrigation water or injected, under pressure, into the soil or plant growth media, usually between plant rows.

Dispersing agents, emulsifiers and antifoaming agents also are useful to add to the liquid nitrification inhibiting compositions if desired.

In the present application the term "reduced nitrogen fertilizers" is employed in the present specification and claims, as understood in the art, as encompassing both solid and liquid inorganic and organic nitrogenous materials containing nitrogen in the reduced state. Examples of known reduced nitrogen fertilizers include anhydrous and aqueous ammonia, inorganic ammonium salts such as ammonium phosphate, ammonium nitrate and ammonium sulfate, ammonium salts of organic acids, urea, cyanamide, guanidine nitrate, dicyandiamide, amino acids, guanyl urea sulfate, thiourea, uramon, amines, urea-form and other nitrogen containing organic chemical fertilizers as well as protein mixtures, animal tankages, green manure, fish products, crop residues, and other natural materials recognized as sources of ammonium ions in soil.

In accordance with the method of the present invention, suppression of nitrification of ammonium nitrogen in plant growth media or soil is achieved by applying to said plant growth media or soil a nitrification-inhibiting amount of an ionophore. Whether applied in liquid or solid form, neat or the admixture with a reduced nitrogen fertilizer or other adjuvants as described above, about 0.125 kg/hectare to about 2.0 kg/hectare of the ionophore or ionophore salt distributed throughout the plant growth media or soil inhibits nitrification of ammonium nitrogen in the treated media or soil.

Liquid compositions containing the ionophore are prepared by dispersing about 60 g/L to about 480 g/L of the ionophore or ionophore salt in a liquid fertilizer, with or without the aid of dispersing agents and/or emulsifying agents. Liquid fertilizers such as aqueous ammonia, aqueous urea and urea formaldehyde concentrates including, methylol ureas and methylene duirea, are useful in these preparations.

These liquid compositions are concentrates which can be applied neat, but generally are dispersed in water or inexpensive organic solvent and applied as a relatively dilute spray in sufficient quantity to provide about 0.125 to about 2.0 kg/hectare of the ionophore.

Liquid compositions are prepared by first dissolving the ionophore in an organic solvent, such as benzyl alcohol, $C_1$-$C_6$ ketones, $C_1$-$C_6$ alcohols, dimethylformamide phenol, phenol derivatives, dimethylsulfoxide or the like, with or without the aid of a surface active dispersing agent or emulsifier, and then dispersing the thus-prepared concentrate in water or an organic solvent, such as a petroleum distillate, xylene, toluene or the like, for application as a liquid spray or for sub-soil injection. It may be useful for the ionophore-organic solvent concentrate to be dispersed in a liquid fertilizer, such as anhydrous ammonia, aqueous ammonia, aqueous urea, methylol urea or the like, and applied as a liquid spray or injected into the soil. This latter arrangement provides both fertilization of the treated soil and nitrification inhibition. In these fertilizer compositions, solvents, such as benzyl alcohol, $C_1$-$C_6$ alcohols, $C_1$-$C_6$ ketones, phenol or phenol derivatives are generally preferred as the solvent for the ionophore and usually employed at rates of about 0.04% to about 10%, preferably about 0.04% to about 5%, by weight, of the liquid fertilizer.

Solid compositions useful for dispersing the ionophore include solvents, such as acetone or methylene chloride. Then, these can be sprayed on a sorptive or non-sorptive carrier. Sorptive carriers which may be used include: clays such as montmorillonite, attapulgite and kaolin; ground corn cobs, talc, pumice, gypsum and the like.

When a non-sorptive carrier, such as sand, marble chips or oyster shell is used, the solvent solution of ionophore is sprayed onto the carrier and the solvent evaporates from the treated carrier. If desired, a fumed silica or similar material, is applied to the treated carrier to act as a dryer and/or lubricant for the coated carrier.

Solid particulate fertilizer compositions prepared in essentially the same manner as described above for the preparation of solid compositions but substituting ammonium nitrate, ammonium sulfate, urea formaldehyde granules, urea prills, calcium cyanamide or any of a variety of granulated fertilizer products, for the inert carriers mentioned above are also useful.

A typical flowable formulation of an ionophore useful in the practice of the present invention is prepared by grinding together on a w/v basis, about 30% of a wet fermentation cake of the selected ionophore; about 58.6% of water; about 8.0% propylene glycol; about 0.1% nonylphenoxy polyethoxyethanol (nonionic dispersing agent); about 0.1% octyl phenoxypolyethoxyethanol (nonionic low foam spray adjuvant); about 0.1% citric acid; about 0.1% paraformaldehyde; about 0.1% silicone antifoam; about 0.1% colloidal magnesium silicate; about 2.5% lignosulfonate and about 0.3% xanthan gum.

A typical liquid concentrate mixes together about 20% to 30%, by weight, of wet fermentation cake of an ionophore in 70% to 80%, by weight, of an organic solvent such as 2-ethyl-1-hexanol, xylene, benzyl alcohol, dimethylsulfoxide, or a heavy aromatic solvent such as Tenneco 500/100 ®, with about 0% to about 7%, by weight, of propylene glycol. After stirring, the mixture is filtered and the solution obtained contains about 5% to 15% ionophore and can be mixed with aqueous ammonia, anhydrous ammonia or other liquid fertilizer for application as a liquid spray.

For a further understanding of the invention and the advantages afforded thereby, examples are set forth below and provided simply by way of illustration of the invention and not as a limitations thereof.

EXAMPLE I

Evaluation of test compounds as nitrification inhibitors in soil

In these evaluations, one hundred grams (100 g) of oven dry, silt loam field soil with low residual nitrogen is added to a 6×12 cm screw-capped glass jar for each sampling date to provide an optimum environment for nitrification.

Two replicates of each treatment-sampling date are established. The soil is adjusted to 50% water saturation with an aqueous solution of ammonium sulfate at 200 ppm N and the chemical to be tested as a nitrification inhibitor at rates of from 0.10 to 0.50 ppm.

Incubation is at either 25° C. or 38° C. for 0, 1, 2, 4, 7, 9, 12, 16 or 20 weeks. Inorganic N is extracted by adding 2M KCl (10:1 v/w) and shaking for one hour, allowing settling for fifteen minutes. A 10 ml aliquot from the supernatant is assayed for ammonium, nitrite and nitrate by standard steam distillation methods (AOAC, pp. 653–655). Nitrapyrin (0.5 ppm) is used as a nitrification inhibitor for comparison. Benzyl alcohol, acetone, and a non-N amended soil are run as controls and as a check on mineralization.

Treatments include:

| Compound | Nitrification Inhibitor (ppm) |
|---|---|
| Soil Control | 0 |
| Nitrogen Control | 200 |
| Nitrapyrin | 0.50 |
| Maduramicin X-14868A | 0.50 |
| (Monoammonium Salt) | 0.25 |
|  | 0.10 |
| Monensin | 0.50 |
| (Sodium Salt) | 0.25 |
|  | 0.10 |
| Salinomycin | 0.50 |
| (Monosodium Salt) | 0.25 |
|  | 0.10 |
| Lasalocid | 0.50 |
| (Sodium Salt) | 0.25 |
|  | 0.10 |
| Benzyl Alcohol | 5% |

Nitrification: Ammonium recovery and nitrate accumulation are indicative of nitrification, and data obtained with test compounds are reported in Tables I and II.

TABLE I

Recovery of Ammonium Nitrogen (PPM) after incubation of ammonium in soil at 25° C. with various compounds.

| Treatment Compound | Rate | Weeks Incubation | | | | | | | | |
|---|---|---|---|---|---|---|---|---|---|---|
|  |  | 0 | 1 | 2 | 4 | 7 | 9 | 12 | 16 | 20 |
| O Nitrogen | Control | 8 | 5 | 2 | 0 | 5 | 5 | 2 | 8 | — |
| Nitrogen | Control | 193 | 124 | 68 | 26 | 6 | 1 | 1 | 32 | 3 |
| Nitrapyrin | 0.50 ppm | 193 | 155 | 177 | 185 | 188 | 174 | 184 | 70 | 25 |
| Maduramicin | 0.10 ppm | 195 | 168 | 178 | 176 | 125 | 110 | 55 | 67 | 39 |
| monammonium | 0.25 ppm | 194 | 162 | 164 | 187 | 198 | 185 | 192 | 164 | 102 |
| salt | 0.50 ppm | 194 | 162 | 166 | 170 | 194 | 193 | 189 | 209 | 175 |
| Monensin | 0.10 ppm | 194 | 175 | 175 | 155 | 17 | 3 | 2 | 5 | — |
| sodium salt | 0.25 ppm | 195 | 179 | 181 | 193 | 199 | 157 | 124 | 74 | 21 |
|  | 0.50 ppm | 195 | 176 | 185 | 181 | 194 | 200 | 194 | 110 | 143 |
| Salinomycin | 0.10 ppm | 194 | 171 | 183 | 184 | 136 | 3 | 10 | 5 | 0 |
| monosodium | 0.25 ppm | 193 | 176 | 189 | 185 | 167 | 171 | 168 | 111 | 4 |
| salt | 0.50 ppm | 194 | 167 | 185 | 170 | 197 | 196 | 191 | 205 | 176 |
| Lasalocid | 0.10 ppm | 194 | 177 | 143 | 109 | 7 | 0 | 8 | 3 | — |
| sodium salt | 0.25 ppm | 194 | 184 | 186 | 197 | 194 | 147 | 180 | 78 | 44 |
|  | 0.50 ppm | 195 | 169 | 168 | 173 | 199 | 202 | 215 | 175 | 135 |
| Benzyl Alcohol | 5% | 194 | 163 | 163 | 168 | 164 | 41 | 163 | 169 | 139 |
| Acetone | 5% | 194 | 138 | 122 | 127 | 8 | 1 | 1 | 1 | — |

Amended with 200 ppm N as ammonium sulfate; Silt loam field soil previously cropped to non-fertilized corn to reduce residual soil nitrogen.

TABLE II

Concentration of nitrate nitrogen (PPM) in ammonium amended soil after incubation with various compounds at 25° C.

| Treatment Compound | Rate | Weeks Incubation | | | | | | | | |
|---|---|---|---|---|---|---|---|---|---|---|
|  |  | 0 | 1 | 2 | 4 | 7 | 9 | 12 | 16 | 20 |
| O Nitrogen | Control | 18 | 31 | 35 | 44 | 67 | 61 | 69 | 58 | — |
| Nitrogen | Control | 18 | 25 | 83 | 84 | 200 | 193 | 215 | 202 | 209 |
| Nitrapyrin | 0.50 ppm | 18 | 11 | 23 | 21 | 25 | 39 | 49 | 148 | 163 |
| Maduramicin | 0.10 ppm | 18 | 20 | 19 | 24 | 75 | 59 | 152 | 153 | 134 |
| monoammonium | 0.25 ppm | 19 | 18 | 19 | 19 | 21 | 25 | 23 | 64 | 85 |
| salt | 0.50 ppm | 18 | 20 | 18 | 21 | 21 | 25 | 18 | 28 | 44 |
| Monensin | 0.10 ppm | 18 | 17 | 17 | 45 | 199 | 220 | 206 | 213 | — |
| sodium salt | 0.25 ppm | 19 | 22 | 21 | 23 | 28 | 54 | 70 | 158 | 121 |
|  | 0.50 ppm | 18 | 18 | 21 | 22 | 23 | 19 | 22 | 121 | 72 |
| Salinomycin | 0.10 ppm | 18 | 20 | 20 | 26 | 27 | 201 | 219 | 233 | — |
| monosodium | 0.25 ppm | 19 | 23 | 22 | 23 | 45 | 44 | 57 | 121 | 187 |
| salt | 0.50 ppm | 19 | 22 | 21 | 18 | 18 | 26 | 39 | 28 | 45 |
| Lasalocid | 0.10 ppm | 19 | 21 | 41 | 90 | 197 | 219 | 220 | 223 | — |
| sodium salt | 0.25 ppm | 18 | 21 | 18 | 28 | 26 | 68 | 46 | 158 | 154 |
|  | 0.50 ppm | 18 | 18 | 14 | 18 | 18 | 17 | 20 | 52 | 26 |
| Benzyl Alcohol | 5% | 19 | 21 | 16 | 20 | 15 | 99 | 19 | 27 | 20 |
| Acetone | 5% | 19 | 7 | 0 | 36 | 75 | 100 | 155 | 165 | — |

Amended with 200 ppm N as ammonium sulfate; Silt loam field soil previously cropped to non-fertilized corn to reduce residual soil nitrogen.
— = not analyzed because previously indicated as fully nitrified.

The non-treated nitrogen control is 85% nitrified by the 4th week and 97% nitrified by the 7th week of incubation. The initial rate of nitrification is slowed slightly by acetone but is similar to the control by the 7th week of incubation. The high rate (5%) of benzyl alcohol used in this study markedly inhibited nitrification throughout the incubation period. The sharp drop in ammonium at 9 weeks is an apparent treatment miss since recovery is resumed afterwards (weeks 12, 16, 20) and persists.

Nitrapyrin inhibits nitrification for 12 weeks, after which the rate of nitrification proceeds to 65% by the 16th week and 87% by the 20th week. The low rate (0.10 ppm) of Maduramicin, X-14868A monoammonium salt, delays nitrification through the 9th week but is not as effective as the 0.5 ppm rate of nitrapyrin; however, the 0.25 rate of Maduramicin, X-14868A monoammonium salt, inhibits nitrification through the 16th week, and the 0.5 ppm rate inhibits it throughout the 20 weeks incubation period of the study. Maduramiusing the nitrite and nitrate analysis of the American Organization of Analytical Chemists (AOAC pp. 653–655).

Failure to detect an accumulation of nitrite in soil treated in this manner indicates that none of the test compounds is active against Nitrobacter spp. However, an accumulation of nitrate corresponding to the loss of ammonium nitrogen indicates that the test compounds are specific for controlling Nitrosomonas spp.

Table III summarizes these results. It is seen that Maduramicin, monoammonium salt, Monensin, sodium salt, Salinomycin, monosodium salt, and Lasalocid, sodium salt, appear to specifically inhibit nitrification through activity against Nitrosomonas spp.

TABLE III

| Treatment | | Concentration of nitrite nitrogen (ppm) in ammonium amended soil after incubation at 25° C. with various compounds. | | | | | | | | |
|---|---|---|---|---|---|---|---|---|---|---|
| | | Weeks Incubation | | | | | | | | |
| Compound | Rate | 0 | 1 | 2 | 4 | 7 | 9 | 12 | 16 | 20 |
| O Nitrogen | Control | 4 | −1 | −3 | 3 | −12 | 3 | 7 | 13 | 11 |
| Nitrogen | Control | 7 | −1 | −3 | 3 | −12 | 3 | 7 | 13 | 11 |
| Nitrapyrin | 0.50 ppm | 6 | 6 | 3 | 5 | −1 | 8 | −10 | 15 | 34 |
| Maduramicin | 0.10 ppm | 6 | 17 | 2 | 3 | 12 | 49 | 9 | 14 | 56 |
| monammonium | 0.25 ppm | 7 | 2 | 7 | 0 | −5 | 12 | 0 | −2 | 33 |
| salt | 0.50 ppm | 8 | 10 | 4 | 4 | −8 | −4 | 4 | −13 | 14 |
| Monensin | 0.10 ppm | 9 | −4 | 4 | 11 | 7 | 16 | 18 | 7 | 11 |
| sodium salt | 0.25 ppm | 6 | 3 | 6 | 7 | −4 | 17 | 30 | 3 | 90 |
| | 0.50 ppm | 6 | 5 | 6 | 0 | 2 | −7 | 4 | 2 | 22 |
| Salinomycin | 0.10 ppm | 7 | 5 | 7 | 6 | −4 | 25 | 7 | 7 | 11 |
| monosodium | 0.25 ppm | 8 | 5 | 3 | 7 | −1 | 7 | 9 | 2 | 47 |
| salt | 0.50 ppm | 9 | 3 | 3 | 14 | 4 | −1 | 1 | 8 | 14 |
| Lasalocid | 0.10 ppm | 8 | 2 | 1 | 15 | 12 | 10 | 5 | 6 | 11 |
| sodium salt | 0.25 ppm | 5 | 0 | 3 | 2 | 0 | 3 | 8 | −1 | 40 |
| | 0.50 ppm | 7 | 2 | 6 | 2 | −4 | 2 | −11 | 7 | 7 |
| Benzyl Alcohol | 5% | 6 | 5 | 5 | 6 | 3 | −1 | 5 | 1 | 27 |
| Acetone | 5% | 6 | 4 | −1 | 9 | 56 | 5 | 20 | 10 | 11 |

Amended with 200 ppm N as ammonium sulfate; Silt loam field soil previously cropped to non-fertilized corn to reduce residual soil nitrogen.

cin, X-14868 monoammonium salt, is considerably more effective than nitrapyrin.

Maduramicin, X-14868A monammonium salt, is the most effective nitrification inhibitor evaluated in these studies. Salinomycin, monosodium salt, is the second most effective inhibitor. All of the polyether ionophores are more effective than nitrapyrin at the 0.5 ppm rate and are comparable to 0.5 ppm nitrapyrin at the 0.25 ppm rates.

EXAMPLE 2

Determination of nitrite and nitrate nitrogen in soil treated with nitrification inhibitors Determination of nitrite nitrogen and nitrate nitrogen in soil prepared in Example 1 above, which is amended with 200 ppm of nitrogen as aqueous ammonium sulfate, treated with from 0.1 ppm to 0.5 ppm of a test compound and incubated at 25° C. for 20 days, is determined

EXAMPLE 3

Determination of Nitrification Inhibition of Soil amended with 200 ppm of nitrogen as ammonium sulfate and 0.5 ppm of Nitrapyrin or 0.5 ppm of Maduramicin, monoammonium salt.

Soil samples prepared as described in Example 1 above are incubated at 38° C. for 20 weeks. Samples are taken at intervals during the 20 week period, extracted with 2M KCl (10:1 v/w), and assayed for ammonium nitrite and nitrate by standard steam distillation methods. Data obtained are reported in Table IV. Nitrification inhibition obtained with Maduramicin was slightly better than that obtained with nitrapyrin. The data also indicate no activity against Nitrabacter since nitrites did not accumulate, but the good activity against Nitrosomonos is evident by the nitrate accumulation corresponding to ammonium loss.

TABLE IV

| Treatment | | Nitrification of field soil amended with 200 ppm ammonium nitrogen (Ammonium sulfate) and Nitrapyrin or Maduramicin monoammonium salt after incubation at 38° C. reported as nitrogen (ppm). | | | | | | | | |
|---|---|---|---|---|---|---|---|---|---|---|
| | | Weeks Incubation | | | | | | | | |
| Compound | Rate | 0 | 1 | 2 | 4 | 7 | 9 | 12 | 16 | 20 |
| Ammonium Recovery: | | | | | | | | | | |
| O Nitrogen | Control | 11 | 7 | 1 | 0 | 5 | 1 | 1 | 3 | — |
| Nitrogen | Control | 193 | 156 | 116 | 36 | 25 | 14 | 18 | 16 | 4 |
| Maduramicin monoammonium salt | 0.50 ppm | 193 | 178 | 193 | 199 | 208 | 168 | 154 | 129 | 95 |
| Nitrapyrin | 0.50 ppm | 194 | 188 | 195 | 200 | 179 | 141 | 125 | 127 | 91 |
| Nitrite: | | | | | | | | | | |

TABLE IV-continued

Nitrification of field soil amended with
200 ppm ammonium nitrogen (Ammonium sulfate) and Nitrapyrin or
Maduramicin monoammonium salt after incubation at 38° C. reported as nitrogen (ppm).

| Treatment | | Weeks Incubation | | | | | | | | |
|---|---|---|---|---|---|---|---|---|---|---|
| Compound | Rate | 0 | 1 | 2 | 4 | 7 | 9 | 12 | 16 | 20 |
| O Nitrogen | Control | 6 | −2 | 16 | 4 | 14 | 4 | −2 | 15 | 11 |
| Nitrogen | Control | 8 | 7 | 52 | 21 | 19 | 31 | 7.4 | 5 | 47 |
| Maduramicin monoammonium salt | 0.50 ppm | 9 | 8 | 4 | 3 | −5 | 9 | 6 | 19 | 37 |
| Nitrapyrin | 0.50 ppm | 6 | 3 | 12 | 9 | −27 | 14 | 14 | 7 | 27 |
| Nitrate: | | | | | | | | | | |
| O Nitrogen | Control | 17 | 45 | 40 | 79 | 71 | 95 | 112 | 84 | — |
| Nitrogen | Control | 18 | 41 | 34 | 178 | 199 | 207 | 243 | 253 | 227 |
| Maduramicin monoammonium salt | 0.50 ppm | 18 | 20 | 17 | 9 | 15 | 52 | 76 | 112 | 111 |
| Nitrapyrin | 0.50 ppm | 20 | 18 | 15 | 22 | 48 | 79 | 114 | 126 | 128 |

EXAMPLE 4

Urease activity of urea amended soil incubated with Maduramicin or phenylphosphorodiamide at 38° C. for 24 hours Urease activity: Five grams (5 g) oven-dry soil is treated with 5 ml of aqueous urea solution (1000 ug/g soil), with or without the test compound, and incubated in 65 ml screw-capped glass bottles at 38° C. for 24 hrs. Three replicates of each treatment are established. Phenylphosphorodiamide (PPD) is used as a urease inhibitor for comparison with Maduramicin monoammonium salt. Urea remaining is determined after extracting the soil for 60 minutes (with shaking) with 50 ml of 2M KCl containing 0.5 ug/ml of phenylmercuric acetate and filtering the soil suspension. Urea in the extract is determined colorimetrically (Douglas & Bremner, 1970). The percentage inhibition is calculated from $(A-B)/(C-B) \times 100 - \%$ inhibition; where A=the amount of urea found after incubation with the compound, B=the amount of urea found in the non-treated soil, and C=the amount of urea added.

Data obtained are reported in Table V below.

TABLE V

Urease activity in urea amended soil incubated with at 38° C. for 24 hrs.

| TREATMENT | REPLICATE | ABS | AMOUNT REMAINING ug/g | AVERAGE | % INHIBITION* |
|---|---|---|---|---|---|
| Check | 1 | 196 | 382 | 383 | |
| | 2 | 197 | 385 | | |
| | 3 | 196 | 382 | | |
| Maduramicin monoammonium salt | 1 | 241 | 492 | 483 | 16 |
| | 2 | 234 | 477 | | |
| | 3 | 234 | 477 | | |
| PPD | 1 | 346 | 755 | 769 | 63 |
| | 2 | 351 | 767 | | |
| | 3 | 352 | 770 | | |

*Calculated as:
$\frac{A - B}{C - B} = \%$ inhib.
where A = amount remaining with treatment
B = amount of the check remaining,
and C = amount of urea (1000 ug/g soil).

EXAMPLE 5

Field Evaluation: Field evaluations are based on the N content of corn leaf tissue and grain yield utilizing two soil types. Replicate (4X) field plots are established at two different locations, one having (I) silt loam soil and one (II) with sandy loam soil. These soils had been previously cropped to non-fertilized corn to reduce the level of residual N. Maduramicin monoammonium salt is applied (0.25, 0.125, 0.07 ppm) with NH$_3$ (84 or 168 kg N/ha) through a "downstream" by an injection system into silt loam plots. Nitrapyrin (0.25 ppm=0.56 kg a.i./ha), nitrogen checks, benzyl alcohol (1.16L/ha) (BA) and a O nitrogen check are included for comparison. Individual replicate plot sizes are 3.04M×22.8M (4, 76-cm corn rows×22.8M long) Anhydrous ammonia are injected on 76-cm centers.

Urea, treated or non-treated with Maduramicin monoammonium salt is broadcast on the surface of sandy loam plots. Plots are then planted with corn the day following treatment. Treatments are reported in Table VI. Dekalb T2000 is planted 10 May on silt loam plots and Pioneer 3352 is planted 11 May in sandy loam plots.

TABLE VI

Treatments used for field evaluation of Maduramicin monoammonium salt

| Nitrogen | | | Inhibitor | |
|---|---|---|---|---|
| Source | Rate kg/ha | Applied | Type | Rate kg/ha |
| 0 | 0 | 0 | 0 | 0 |
| NH$_3$ | 84 | Inject | 0 | 0 |
| NH$_3$ | 168 | Inject | 0 | 0 |
| NH$_3$ | 84 | Inject | Nitrapyrin | 0.56 |
| NH$_3$ | 168 | Inject | Nitrapyrin | 0.56 |
| NH$_3$ | 84 | Inject | Maduramicin monoammonium salt | 0.56 |
| NH$_3$ | 168 | Inject | Maduramicin monoammonium salt | 0.56 |
| NH$_3$ | 84 | Inject | Maduramicin monoammonium salt | 0.28 |
| NH$_3$ | 168 | Inject | Maduramicin monoammonium salt | 0.28 |
| NH$_3$ | 84 | Inject | Maduramicin monoammonium salt | 0.11 |
| NH$_3$ | 168 | Inject | Maduramicin monoammonium salt | 0.11 |
| NH$_3$ | 168 | Inject | Benzyl Alcohol | 1.1 l/ha |
| Urea | 84 | Surface | 0 | 0 |
| Urea | 168 | Surface | 0 | 0 |
| Urea | 84 | Surface | Maduramicin monoammonium salt | 0.56 |
| Urea | 168 | Surface | Maduramicin monoammonium salt | 0.56 |

Tillage: Conventional, Fall plow, spring field cultivator, disc, plant.

Insecticide Counter at plant

Herbicide: 1.1 L. Lasso, 1.5 Bladex, 0.7 L. Atrazine

N applied: Silt loam plots=9 May Sandy loam plots=10 May

Corn Hybrid: Silt loam plots=Dekalb T2000 (B73×LH 38), Sandy loam plots=Pioneer 3352.

Corn ear leaf tissues collected at silking on silt loam plots or 60 days post silking (on silt loam and sandy loam plots) are collected from each plot and assayed for total N (AOAC procedures). Grain yields are determined by harvesting the two center rows×15.2 m of each plot.

FIELD RESULTS

Treatments are applied relatively late in the Spring (May 9, 10), and an extended period of below-average precipitation is encountered in late June-July, which reduces nitrogen losses and the over-all yield potential of the hybrids used. The B-73×LH38 hybrid grown on the silt loam plots appear especially sensitive to moisture stress during this growth stage. Corn leaf tissues are not collected from the sandy loam plots at the mid-silk stage because plants are severely "wilted" (leaves rolled).

Tissue Nitrogen: Leaf tissues from the silt loam plots and treated with control and O nitrogen control plots indicate a deficiency of N, while plants from similar nitrogen plots receiving Maduramicin monoammonium salt or nitrapyrin contain 15–25% more nitrogen and approach vegetative saturation (Table VII). No differences are observed between the three rates of Maduramicin monoammonium salt in tissue N, but all are slightly higher than nitrapyrin-treated plants. Vegetative N saturation occurs with all the 110 kg N/ha treatments. Lower tissue N in urea-fertilized plants indicates significant volatilization losses of N from the broadcast treatment.

Grain Yield: A consistent, although not generally significant, yield increase is observed by inhibiting nitrification (Table VII) at the silt loam location. This probably reflects the moisture stress during the growing season and sensitivity of the B73×LH38 hybrid to it.

TABLE VII

Corn Leaf Tissue Analysis[a], Silt Loam Plots

| | kg/ha | 0 | 84 | 168 | 252 |
|---|---|---|---|---|---|
| | | | $10^2$ ug/g | | |
| $NH_3$ 0 | 0 | 154 | 203 | 275 | |
| $NH_3$ Nitrapyrin | 0.56 | — | 232 | 291 | |
| $NH_3$ Maduramicin monoammonium salt | 0.56 | — | 258 | 281 | |
| $NH_3$ Maduramicin monoammonium salt | 0.28 | — | 256 | 275 | |
| $NH_3$ Maduramicin monoammonium salt | 0.11 | — | 257 | 268 | |
| $NH_3$ Benzyl alcohol | 1.1 l/ha | — | — | 271 | |
| Urea 0 | 0 | — | 188 | 245 | 264 |

[a]Ear leaf at silking, average of four replications of ten leaves each.

In contrast, yields at the sandy loam location are significantly higher at both rates of $NH_3$ and the lower rate of urea amended with 0.56 kg a.i. Maduramicin/hectare (Table VIII). The generally higher yields at the sandy loam location reflects the hardiness of the Pioneer 3352 hybrid selected for these plots. Adjacent plots with B73×LH38 yields are comparable to the silt loam plots and exhibit severe drought symptoms around the tasseling stage of plant growth.

Limited differences in yield are observed in these studies and reflect the extensive period of below normal precipitation which reduces the plants response to nitrogen and nitrogen losses. Tissue analyses indicate excellent inhibition of nitrification.

TABLE VIII

Yield of Corn, Silt Loam Location

| TREATMENT | | AVERAGE YIELD 4-REPLICATES |
|---|---|---|
| N kg/ha CHEMICAL | RATE kg/ha | HECTOLITERS/HECTARE |
| 84 0 | 0 | 127.9 |
| 168 0 | 0 | 146.2 |
| 84 Maduramicin monoammonium salt | 0.56 | 131.4 |
| 168 Maduramicin monoammonium salt | 0.56 | 147.9 |
| 84 Maduramicin monoammonium salt | 0.28 | 129.6 |
| 168 Maduramicin monoammonium salt | 0.28 | 146.2 |
| 84 Maduramicin monoammonium salt | 0.11 | 136.6 |
| 168 Maduramicin monoammonium salt | 0.11 | 154.0 |
| 84 Nitrapyrin | 0.56 | 133.4 |
| 168 Nitrapyrin | 0.56 | 148.8 |
| 168 Benzyl Alcohol | 1.2 l/ha | 140.9 |
| 0 0 | 0 | 69.6 (Untreated Control) Baysian LSD = 8.95 |

** = Duncan's multiple range

TABLE IX

Yield of Corn, From Sandy Loam Plots

| TREATMENT | | AVERAGE YIELD 4-REPLICATES | |
|---|---|---|---|
| N kg/ha CHEMICAL | RATE kg/ha | HECTOLITERS/HECTARE | SIGNIFICANCE |
| 84 0 | 0 | 155.7 | d |
| 168 0 | 0 | 165.3 | ef |
| 84 Maduramicin monoammonium salt | 0.56 | 165.3 | ef |
| 168 Maduramicin monoammonium salt | 0.56 | 176.6 | h |
| 84 Maduramicin monoammonium salt | 0.28 | 159.2 | def |
| 168 Maduramicin monoammonium salt | 0.28 | 174.9 | gh |
| 84 Maduramicin monoammonium salt | 0.11 | 155.7 | d |
| 168 Maduramicin monoammonium salt | 0.11 | 163.6 | def |
| 84 Nitrapyrin | 0.56 | 160.1 | def |
| 168 Nitrapyrin | 0.56 | 167.0 | fg |
| 168 Benzyl Alcohol | 1.2 l/ha | 165.3 | ef |
| 84 Urea | 0 | 138.3 | b |
| 168 Urea | 0 | 157.5 | def |
| 84 Urea & Maduramicin monoammonium salt | 0.56 | 147.0 | c |

TABLE IX-continued

| | Yield of Corn, From Sandy Loam Plots | | | |
|---|---|---|---|---|
| | TREATMENT | | AVERAGE YIELD 4-REPLICATES | |
| N kg/ha | CHEMICAL | RATE kg/ha | HECTOLITERS/HECTARE | SIGNIFICANCE |
| 168 | Urea & Maduramicin monoammonium salt | 0.56 | 156.6 | de |
| 0 | 0 | 0 | 87.0 (Untreated Control) Baysian LSD = 8.61 | a |

*lb a.i./acre; N = as NH$_3$, except urea.
** = Duncan's multiple range analysis

What is claimed is:

1. A method for suppressing the nitrification of ammonium nitrogen in plant growth medium or soil, said method comprising: distributing in the plant growth medium or soil, a nitrification-inhibiting amount of an ionophore or salt thereof.

2. A method according to claim 1, wherein said ionophore is a polyether antibiotic or salt thereof.

3. A method according to claim 1, wherein said ionophore is applied to the plant growth medium or soil at a rate of about 0.125 to 2.0 kg/hectare.

4. A method according to claim 1, wherein said plant growth medium is impregnated with about 0.125 part to 2000 parts, by weight, of said ionophore per million parts, by weight, of said growth medium.

5. A method according to claim 1, wherein said ionophore or ionophore salt is dissolved in an organic solvent and applied as a liquid composition.

6. A method according to claim 1, wherein said ionophore is dissolved in an organic solvent and the thusprepared solution dispersed in a liquid reduced nitrogen fertilizer and applied as a liquid composition.

7. A method according to claim 5, wherein said organic solvent is benzyl alcohol, $C_1$-$C_6$ alcohol, $C_1$-$C_6$ ketone, phenol or phenol derivative.

8. A method according to claim 6, wherein said organic solvent is benzyl alcohol, $C_1$-$C_6$ alcohol, $C_1$-$C_6$ ketone, phenol or phenol derivative.

9. A method according to claim 2, wherein said polyether antibiotic is monensin, salinomycin, lasalocid, maduramicin, D42067α, or a salt thereof.

10. A method according to claim 2, wherein said polyether antibiotic is in the form of an alkali metal or ammonium or organic ammonium salt.

11. A method according to claim 9, wherein said ionophore is maduramicin or a salt thereof.

12. A method according to claim 9, wherein said ionophore is Monensin or a salt thereof.

13. A method according to claim 9, wherein said ionophore is Salinomycin or a salt thereof.

14. A method according to claim 9, wherein said ionophore is Lasalocid or a salt thereof.

15. A fertilizer composition useful for suppressing nitrification of ammonium nitrogen in plant growth medium or soil and preventing rapid loss of ammonium nitrogen therefrom and improving plant nutrition therein, said fertilizer comprising: a reduced nitrogen fertilizer as a source of ammonium nitrogen and a nitrification-inhibiting amount of an ionophore.

16. A fertilizer composition according to claim 15, wherein said ionophore is a polyether antibiotic.

17. A fertilizer composition according to claim 16, wherein said ionophore is Monensin, Salinomycin, Lasalocid, Maduramicin, or D42067α or a salt thereof.

18. A fertilizer composition according to claim 17, wherein said polyether antibiotic is in the form of an alkali metal or ammonium or organic ammonium salt.

19. A fertilizer composition according to claim 18, wherein said ionophore is Maduramicin or a salt thereof.

20. A fertilizer composition according to claim 18, wherein said ionophore is Salinomycin or a salt thereof.

21. A fertilizer composition according to claim 18, wherein said ionophore is Monensin or a salt thereof.

22. A fertilizer composition according to claim 18, wherein said ionophore is Lasalocid or a salt thereof.

23. A fertilizer composition according to claim 16, wherein said reduced nitrogen fertilizer is a liquid fertilizer, said composition contains, in addition to the liquid fertilizer and ionophore, about 0.1% to about 10%, by weight, of an organic solvent in which the ionophore is soluble.

24. A fertilizer composition according to claim 23, wherein said liquid fertilizer is anhydrous ammonia, said ionophore is Monensin, Salinomycin, Lasalocid, Maduramycin, D42067α or a salt thereof and said organic solvent is benzyl alcohol, $C_1$-$C_6$ ketone, $C_1$-$C_6$ alcohol, phenol or phenol derivative.

* * * * *